US005232650A

United States Patent [19]

Behan et al.

[11] Patent Number: 5,232,650

[45] Date of Patent: Aug. 3, 1993

[54] FABRICATION OF DETAIL PARTS FOR SUPERCONDUCTING MAGNETS BY RESIN TRANSFER MOLDING

[75] Inventors: Mark R. Behan, Blue Point; James G. Hartmann, Lake Ronkonkoma, both of N.Y.

[73] Assignee: Grumman Aerospace Corporation, Bethpage, N.Y.

[21] Appl. No.: 815,482

[22] Filed: Dec. 31, 1991

[51] Int. Cl.[5] .............................................. B29C 33/40

[52] U.S. Cl. .................................... 264/219; 264/257; 264/279; 264/279.1; 264/328.4

[58] Field of Search ............ 264/219, 241, 257, 271.1, 264/279, 279.1, 324, 328.1, 328.2, 328.4

[56] References Cited

U.S. PATENT DOCUMENTS

| | | | |
|---|---|---|---|
| 4,988,469 | 1/1991 | Reavely et al. | 264/324 |
| 5,023,041 | 6/1991 | Jones et al. | 264/328.4 |

*Primary Examiner*—Jan H. Silbaugh

*Assistant Examiner*—Christopher A. Fiorilla

*Attorney, Agent, or Firm*—Scully, Scott, Murphy & Presser

[57] ABSTRACT

A process for the fabrication of detail parts for superconducting magnets, such as end saddles, wedge tips, spacers and keys, by a resin transfer molding process, the attributes of which are also utilized in the subsequent fabrication of the superconducting magnet. Pursuant to the process, initially engineering specifications for the detail part are utilized to produce a master mold part for the detail part, while taking into account a calculated resin shrinkage factor. The master mold part is then utilized to fabricate a resin transfer mold for the detail part. A preform for the detail part is then placed into the resin transfer mold, and the mold is closed with the preform therein. A two-stage curing resin is then injected into the mold, and the mold is heated to partially cure the molded detail part. The partially cured detail part is then removed from the resin transfer mold. A coil winding assembly is then fabricated, while precisely positioning each partially cured detail part relative to the coil windings to produce a coil winding assembly. The coil winding assembly is then placed into a curing press, and the coil winding assembly is then pressed and heated therein. The resin softens in this final curing stage to allow each detail part to conform to the coil windings to produce a final coil winding assembly.

10 Claims, 4 Drawing Sheets

FABRICATION OF DETAIL PARTS FOR SUPERCONDUCTING MAGNETS BY RESIN TRANSFER MOLDING

BACKGROUND OF THE INVENTION

1. Field of the Invention

The present invention relates generally to a process for the fabrication of detail parts for superconducting magnets by resin transfer molding and also to the subsequent fabrication of the superconducting magnet. More particularly, the subject invention pertains to a resin transfer molding process for the fabrication of detail parts, such as end saddles, wedge tips, spacers and keys, which are utilized in the assembly of a superconducting magnet.

The construction and fabrication of superconducting magnets such as are utilized in the Relativistic Heavy Ion Collider (RHIC) requires that the coils for such superconducting magnets be fabricated to close tolerances and with materials which will function at relatively high radiation levels and at cryogenic temperatures. During a coil winding operation for a superconducting magnet, precise placement is required of detail parts such as wedge tips and end saddles, particularly the ruled surfaces thereof, and also spacers and keys. Moreover, the dimensions of the coil assembly after winding are considerably larger in length and azimuthal size than the final dimensions of a finished coil assembly, and the coil assembly after winding is subjected to compression at an elevated temperature in a curing press to produce a finished coil assembly.

The location of each wedge tip and end saddle, especially the ruled surfaces thereof, in particular affects how the superconducting coil functions, and there cannot be any voids in the finished coil as void areas generate heat and cause the magnet to quench. When this occurs, the entire superconducting ring must be returned to ambient temperature and the magnet with the void must be removed and replaced. This corrective action is very expensive and time-consuming. During fabrication of the coil winding assembly, properly locating ruled surfaces of the wedge tip and end saddle to the coil windings is critical to avoiding any voids in the finished superconducting coil.

Presently, end saddles are machined from: G-11CR material and wedge tips are machined from G-10CR epoxy material. The dimensions and curves of an end saddle and wedge tip are critical, and require machining of the G-11CR or G-10CR epoxy material in a five axis machining operation which is quite complex. Additionally, machining the end saddles and wedge tips induces internal stresses therein which distort the part's geometry. Moreover, these materials are not elastic, which requires that the parts be machined to final dimensions. Also, the end saddles and wedge tips are positioned on a coil winding which does not achieve its final dimensions until the completion of the curing process. Generally, producing these components by machining as described results in a high scrap rate and elevated costs.

Resin Transfer Molding (RTM) is a well known efficient and very flexible (in terms of component design) fiber reinforced plastics (FRP) manufacturing process. The RTM process involves creating a composite, a combination of two or more materials.

One material is a matrix, most often a thermosetting resin which takes the shape of the finished part and provides color and surface finish therefor. The resin system is generally selected by the molder depending on the specific chemical, electrical, mechanical or thermal properties required for the finished part. Additives and special compounds are available to provide further properties such as surface finish, flame retardance, weather resistance, degree of shrinkage, rate of gel and cure, etc.

The second part of the composite is a reinforcement material, usually in the form of a polyester material or a glass fiber material, but the reinforcement material may include high specific strength materials such as KEVLAR glass fabric material and carbon fiber, as well as various types of core materials and inserts. The reinforcement provides the composite part with strength and toughness. Dry fiber reinforcement in many forms applicable to RTM are placed in the mold prior to clamping and injection. Preforms are dry, preshaped fiber structures (engineered birds nests) resembling the final molded component minus the matrix, and offer an attractive alternative to the slow and laborious manual "floppy fiber mat" loading.

The strength-to-weight ratios of well designed composite structures can be many times that of high tensile steel. Furthermore, it is possible to tailor the properties of a composite structure to exactly match product design requirements.

In its simplest form, the RTM process is a method of molding components from fiber reinforced resins in a two-piece matched cavity mold using pressure. While the RTM mold is open the reinforcing material in dry form is loaded into one of the halves, usually the female. The two halves are then closed and the mold either manually or hydraulically clamped shut.

At this point, a live or catalyzed resin is injected under pressure into the fiber loaded cavity. Depending on the reaction or gel time of the resin and whether the molds are internally heated to assist the reaction process, the mold halves can be opened after a short curing time and the finished part removed. The RTM mold is now ready to be recycled in another molding operation as described hereinabove.

SUMMARY OF THE INVENTION

The present invention replaces the aforementioned machining fabrication of detail parts for superconducting magnets, and instead fabricates the coil winding components by a resin transfer molding process, the attributes of which are also utilized in the subsequent fabrication of the superconducting magnet. This fabrication process produces parts to final part configuration. Moreover, stresses are not induced in the parts during fabrication, as with machining. The parts are fabricated with a preform, such as a preform which can be manufactured and supplied by Cooper Composites, 1840 S. Michigan Avenue, Chicago, IL 60616, with a resin system such as CRYORAD B-staged resin, available commercially from Allied-Signal, Inc., P.O. Box 1021R, Morristown, NJ 07960.

This fabrication process eliminates five axis machining operations, and moreover, all engineering constraints for the detail parts are satisfied.

The CRYORAD B-staged resin system is designed with a two-stage curing procedure which is referred to as B-staged. This two-stage curing procedure allows the ruled surfaces of the end saddle and wedge tip to precisely conform to the coil winding during final curing. Moreover, the ability of the resin to become elastic during the final curing stage allows the various component parts to conform to each other to form a unified coil assembly, and thereby eliminates any potential voids between the coil winding and the end saddle and wedge tip.

Fabricating detail parts, such as end saddles and wedge tips, as well as other detail parts such as end spacers and keys, pursuant to the teachings of the present invention enables the price per part to be considerably less than for prior art machining fabrication of such detail parts.

Accordingly, it is a primary object of the present invention to provide a process for the fabrication of detail parts for superconducting magnets by resin transfer molding.

A further object of the subject invention is the provision of a process for the fabrication of such detail parts by a resin transfer molding process, the attributes of which are also utilized in the subsequent fabrication of the superconducting magnet.

In accordance with the teachings herein, the present invention provides a method of fabricating a detail part for a superconducting magnet and also of fabricating a superconducting magnet. Initially, engineering specifications for the detail part are utilized to produce a master mold part for the detail part, while taking into account a calculated resin shrinkage factor. The master mold part is then utilized to fabricate a resin transfer mold for the detail part. A preform for the detail part is then placed into the resin transfer mold, and the mold is closed with the preform therein. A two-stage curing resin is then injected into the mold, and the mold is heated to B-stage cure the molded detail part. The partially cured detail part is then removed from the resin transfer mold. A coil winding assembly is then fabricated, while precisely positioning each partially cured detail part relative to the coil windings to produce a coil winding assembly. The coil winding assembly is then placed into a curing press, and the coil winding assembly is then pressed and heated in the curing press, during which each detail part conforms to the coil winding and cures to produce a final coil winding assembly.

In greater detail, the master mold part is produced by machining with a computer numeric control program which takes into account a calculated resin shrinkage, and moreover, the master mold part is machined from a material having a low coefficient of thermal expansion such as 6061-T6 aluminum material. The resin transfer mold comprises a female bottom mold component, a male top mold component, and an end closure mold component, having seal grooves machined therein, and further includes a resin injection passageway for injection of preferably a CRYORAD B-staged resin and resin bleeding vents. The preform is formed from a polyester fiber material or a glass fiber material. The detail part being fabricated can comprise any one of the group of detail parts of an end saddle, a wedge tip, a spacer and a key, and any other similar suitable component parts.

BRIEF DESCRIPTION OF THE DRAWINGS

The foregoing objects and advantages of the present invention for the fabrication of detail parts for superconducting magnets by resin transfer molding may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 6:
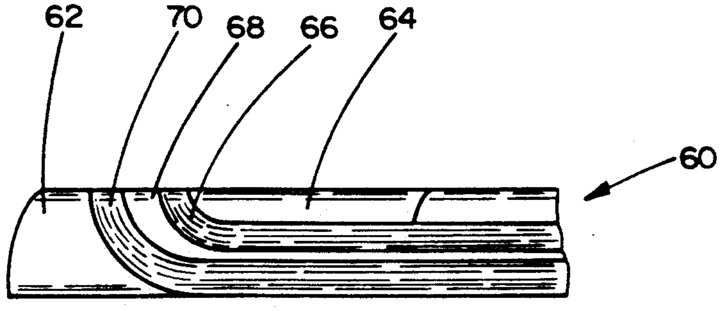
FIG. 6 shows a completed coil assembly, with an end saddle fabricated pursuant to a resin fabrication process positioned adjacent to the coil windings, and also illustrates other detail parts produced by a resin fabrication process pursuant to the present invention positioned and fitted adjacent to the coil windings.

Referring to the drawings in detail, by way of explanation, reference should first be made to FIG. 6 which illustrates an end saddle 62 fabricated pursuant to a resin fabrication process positioned adjacent one end of a final superconducting magnet coil assembly 60, which typically has a length of 31' for RHIC dipole magnets and 50' for SSC dipole magnets. A symmetrically opposite end of the coil assembly has the same components as shown in FIG. 6 arranged in a similar symmetrically opposite manner. The complete coil assembly as described is fitted together with one or more additional coil assemblies to form a complete superconducting magnet, as is known in the art. FIG. 6 also illustrates other detail parts produced by a resin fabrication process pursuant to the present invention positioned and fitted adjacent to the coil windings.

In greater detail, during a coil winding operation, a key 64 is first placed in position on a coil winding mandrel, and a number (e.g. 10) of coil windings 66 (each about ⅜" in diameter or height) are wound around the key 64. A spacer 68 is then placed adjacent to the already wound coil windings, and a number (e.g. 10 to 20) of coil windings 70 are then wound around the spacer 68. An end saddle 62 is then placed adjacent to the end of the coil windings. In alternative embodiments of a superconducting magnet coil assembly, a plurality (e.g. 6) of wedge tips can be placed in position instead of one spacer 68.

After completion of assembly of the parts and winding of the superconducting coil assembly, the dimensions of the coil assembly are considerably larger in length and azimuthal size than the final dimensions of a finished coil assembly, and the coil assembly after winding is subjected to compression at an elevated temperature (e.g. 135° C. for 90 minutes) in a curing press to produce a finished coil assembly.

A manufacturing process for the fabrication of a detail part for a superconducting magnet, such as an end saddle, pursuant to the present invention involves the following sequence of operations. Other detail parts would be fabricated with a similar sequence of operations.

Figure 1A:
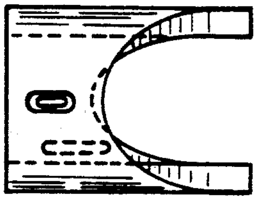
FIGS. 1*a, b, c* and *d* illustrate engineering drawings of an exemplary end saddle, as might be utilized to machine an end saddle, and which serve as a reference to fabricate a computer numerical control program to machine a master mold part pursuant to the method of the present invention.
Figure 1B:
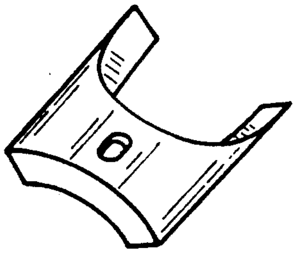
Figure 1C:
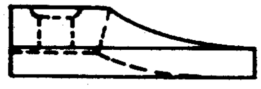
Figure 1D:
Figure 2:
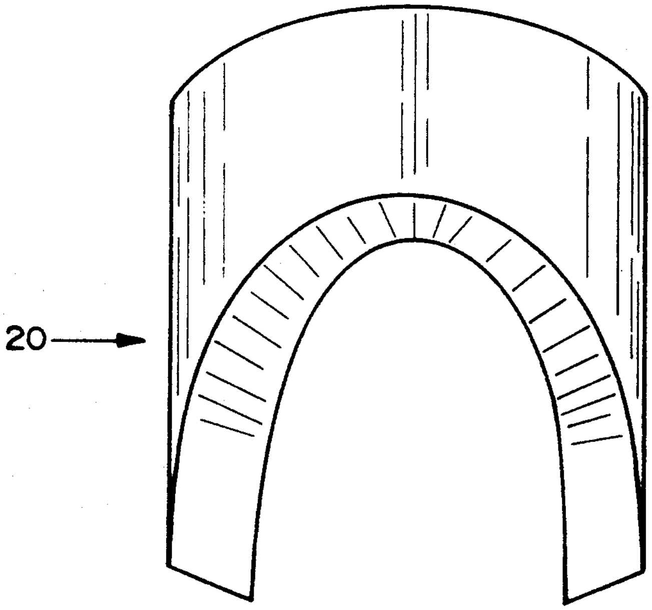
FIG. 2 shows a master mold part machined from a computer numerical control program.

An end saddle reference such as an engineering drawing and specifications as illustrated in FIG. 1 is utilized to fabricate a Computer Numerical Control (CNC) machining program, while taking into account a calculated resin shrinkage factor. FIGS. 1*a, b, c* and *d* are exemplary engineering drawings for an end saddle with many of the details and specifications omitted therefrom, and are exemplary of typical engineering drawings which illustrate the complex curves and shape of a typical end saddle. The master mold part 20, FIG. 2, is preferably machined from 6061-T6 aluminum material to produce a master mold part as illustrated in FIG. 2. A material such as 6061-T6 aluminum is utilized because of its low coefficient of thermal expansion. The master mold part is then inspected on a Coordinate Measuring Machine CMM) for conformance with all specifications.

Figure 3A:
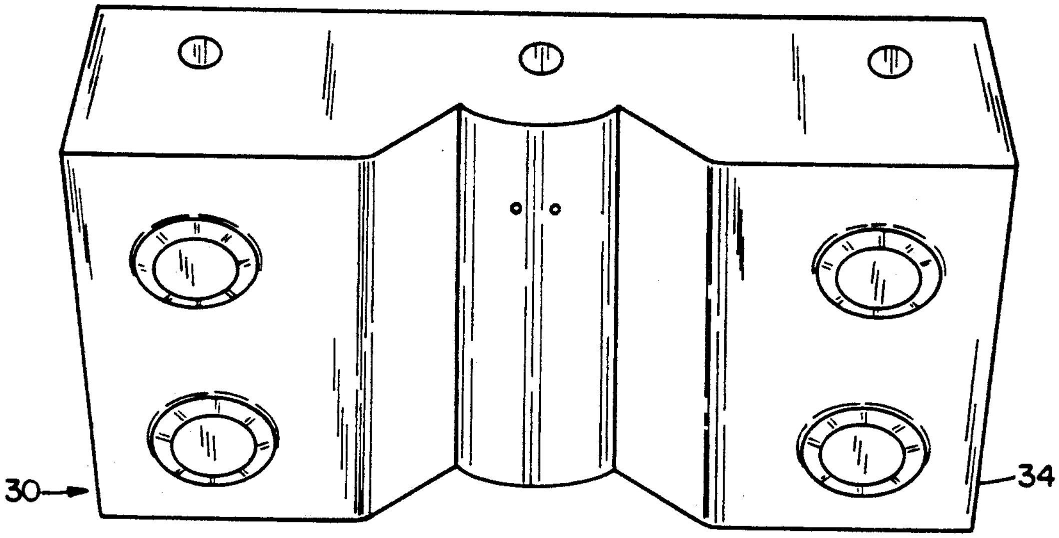
FIGS. 3*a* and *b* illustrate the master mold part of FIG. 2 utilized to fabricate a resin transfer mold.
Figure 3B:
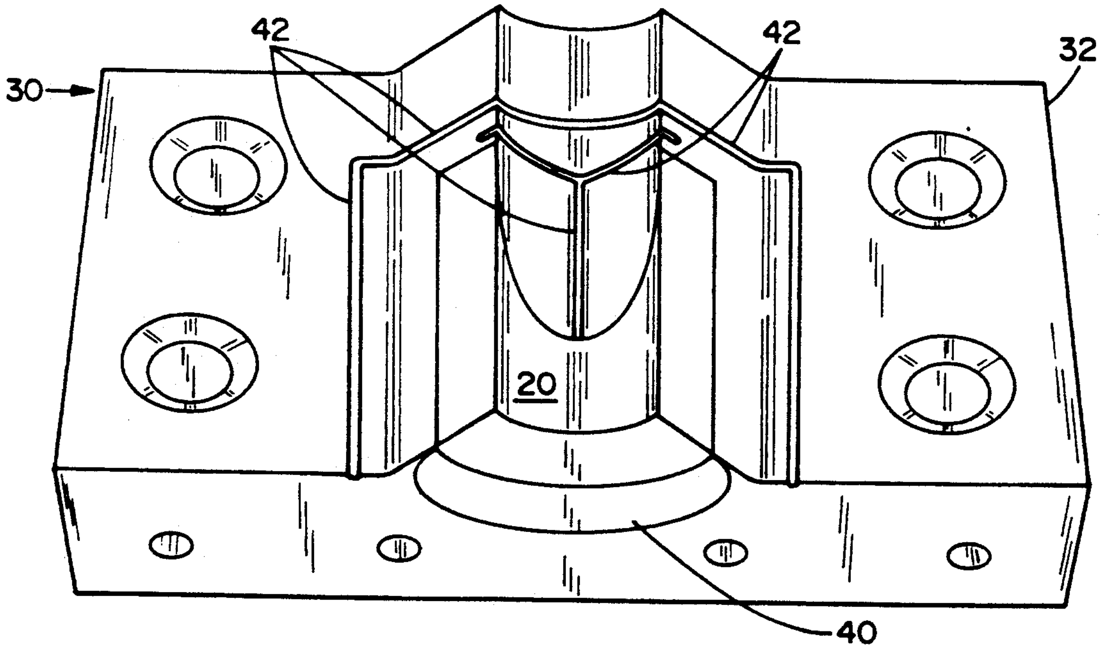

The master mold part 20 is then utilized in a manner as is known in the art to fabricate a Resin Transfer Mold (RTM) 30 from a high temperature mass castable epoxy resin system, as illustrated by FIGS. 3*a*, and *b* and the master mold part 20 is removed from the resin transfer mold. Referring to FIGS. 3*a* and *b* and 5, the resin transfer mold comprises a female bottom mold component 32, a male top mold component 34, and an end closure mold component 36, and further includes a resin injection passageway 38 and resin flow cut-outs 40 for injection of preferably a Cryorad B-staged resin and resin bleeding vents at the end of the bottom mold component opposite to the end by the resin injection passageway. Seal grooves 42 are also machined into the surfaces of the resin transfer mold, as illustrated in FIGS. 3*a* and *b* and 5.

Figure 4:
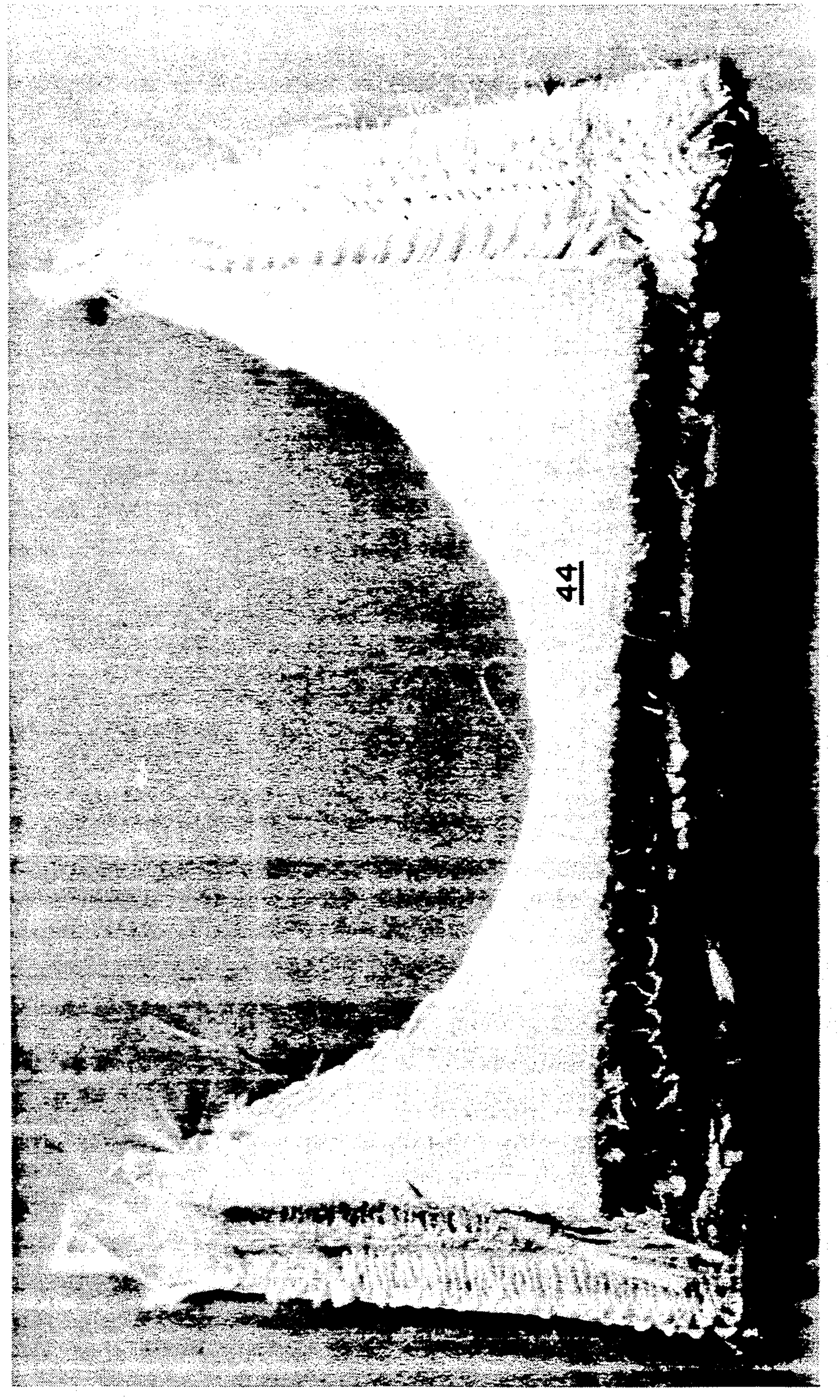
FIG. 4 shows an end saddle preform as supplied by a vendor pursuant to specifications of the end saddle.
Figure 5:
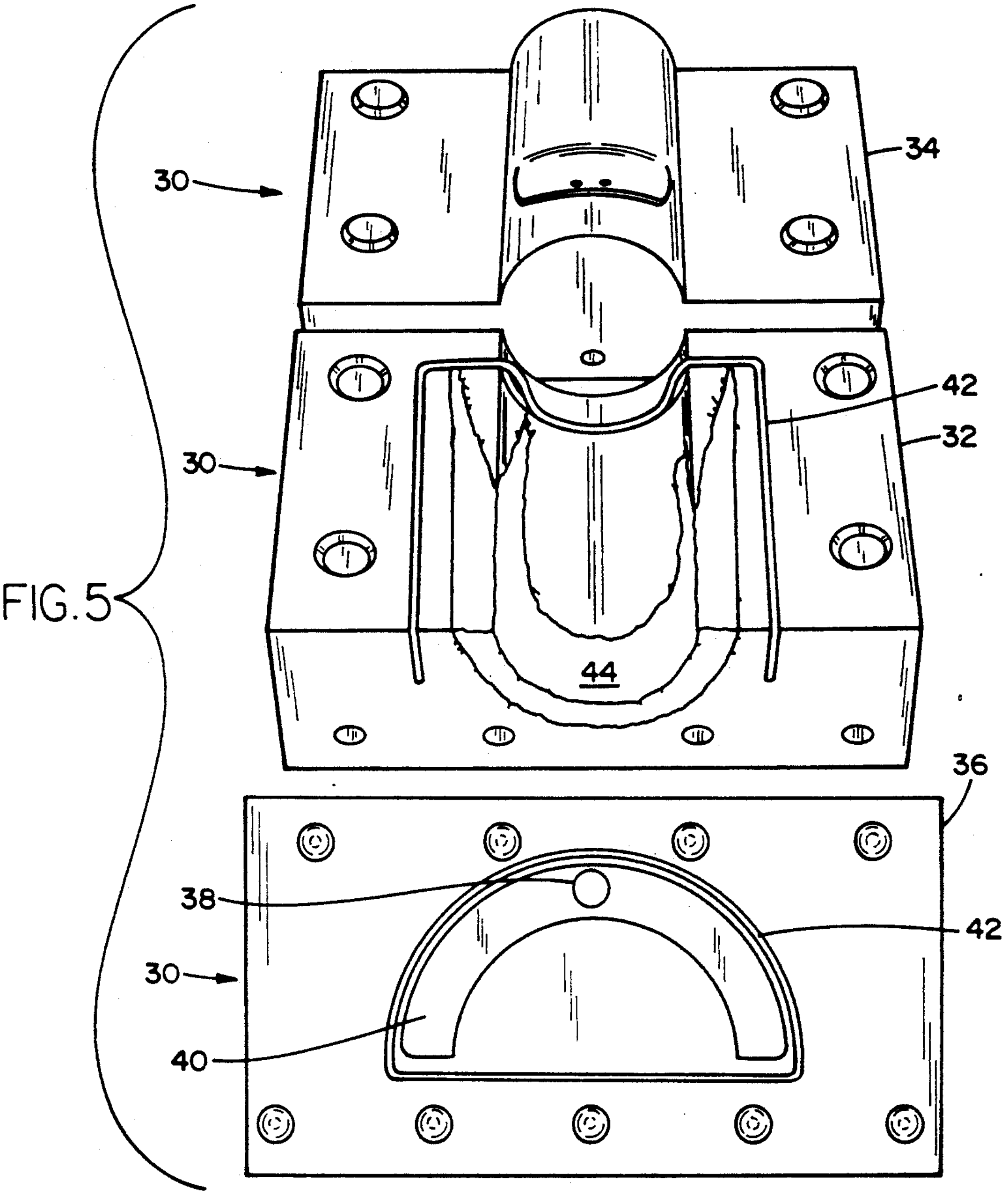
FIG. 5 illustrates a complete resin transfer mold, with an end saddle preform as shown in FIG. 4 placed therein, and with seals placed in seal grooves in the resin transfer mold.

Vendor supplied preforms, as illustrated generally by 44 in FIG. 4, are generally fabricated by the vendor by utilizing an automated near net fiber placer machine. FREEKOTE 700 parting agent is applied to the mold components for mold release, the preform 44 is positioned in the resin transfer mold as illustrated in FIG. 5, and the mold is closed. CRYORD B-staged resin is degassed with a vacuum, and then heated to 170° F., while monitoring the temperature thereof with thermocouples. Silicon pads are used to clamp the resin transfer mold to allow for expansion thereof. The resin transfer mold is then heated in an oven to 220° F., while monitoring the temperature thereof with thermocouples. The heated resin transfer mold is then removed from the oven, and coupled to the resin injection equipment. The heated Cryorad resin is then injected into the mold at 40 PSI for 8–11 minutes until resin bleeds from the mold vents, and after desired venting and bleeding, the vents are closed. The resin transfer mold is then decoupled from the resin injection equipment.

The resin transfer mold is then placed in an oven at 250° F. for two hours, while monitoring the temperature thereof with thermocouples. The resin transfer mold is then removed from the oven, the mold is allowed to reach room temperature, and the molded part is then removed from the resin transfer mold. Flashing is then removed from the molded part, and the molded part is hand sanded to remove glaze. The molded part is then examined for conformance to initial point geometry.

During fabrication of the coil winding assembly, all wedge tips, end saddles, spacers and keys are precisely placed relative to the coil windings to produce a partially finished coil winding assembly, as described hereinabove. The partially finished coil winding assembly is then placed into a curing press and subjected to compression at an elevated temperature (e.g. 135° C. for 90 minutes) to produce a finished coil assembly 60 as illustrated in FIG. 6. During curing, the ruled surfaces of the end saddle and wedge tips make full contact to the coil winding as the Cryorad resin becomes compliant during this final curing operation, which allows the individual component parts to conform to each other and mold into a final unitary coil assembly 60.

While several embodiments and variations of the present invention for the fabrication of detail parts for superconducting magnets by resin transfer molding are described in detail herein, it should be apparent that the disclosure and teachings of the present invention will suggest many alternative designs to those skilled in the art.

What is claimed is:

1. A method of fabricating a detail part for a superconducting magnet and also of fabricating a coil winding assembly for a superconducting magnet, comprising the steps of:

a. utilizing engineering specifications for a detail part to produce a master mold part for the detail part, while taking into account a calculated resin shrinkage factor;
b. utilizing the master mold part to fabricate a resin transfer mold for the detail part;
c. placing a preform for the detail part into the resin transfer mold and closing the mold with the preform therein;
d. injecting a two-stage curing resin into the resin transfer mold;
e. heating the resin transfer mold to partially cure the molded detail part;
f. removing the partially cured detail part from the resin transfer mold;
g. fabricating a coil winding assembly, while precisely positioning the partially cured detail part relative to th coil windings to produce a coil winding assembly;
h. placing the coil winding assembly into a curing press, and pressing and heating the coil winding assembly in the curing press, during which the detail part conforms to the coil winding and cures completely to produce a final coil winding assembly for a superconducting magnet.

2. A method of fabricating a detail part for a superconducting magnet and also of fabricating a coil winding assembly for a superconducting magnet as claimed in claim 1, wherein said injecting step is performed with a B-staged resin.

3. A method of fabricating a detail part for a superconducting magnet and also of fabricating a coil winding assembly for a superconducting magnet as claimed in claim 1, wherein the master mold part is produced by machining with a computer numeric control program which takes into account a calculated resin shrinkage.

4. A method of fabricating a detail part for a superconducting magnet and also of fabricating a coil winding assembly for a superconducting magnet as claimed in claim 3, wherein the master mold part if machined from a material having a low coefficient of thermal expansion.

5. A method of fabricating a detail part for a superconducting magnet and also of fabricating a coil winding assembly for a superconducting magnet as claimed in claim 4, wherein the master mold part is machined from aluminum material having a low coefficient of thermal expansion.

6. A method of fabricating a detail part for a superconducting magnet and also of fabricating a coil winding assembly for a superconducting magnet as claimed in claim 1, wherein the step of fabricating a resin transfer mold comprises fabricating a mold having a female bottom mold component, a male top mold component, and an end closure mold component, having seal grooves machined therein.

7. A method of fabricating a detail part for a superconducting magnet and also of fabricating a coil winding assembly for a superconducting magnet as claimed in claim 6, wherein the resin transfer mold includes a resin injection passageway and resin bleeding vents.

8. A method of fabricating a detail part for a superconducting magnet and also of fabricating a coil winding assembly for a superconducting magnet as claimed in claim 1, wherein the preform is formed from a polyester fiber material.

9. A method of fabricating a detail part for a superconducting magnet and also of fabricating a coil winding assembly for a superconducting magnet as claimed in claim 1, wherein the preform is formed from a glass fiber material.

10. A method of fabricating a detail part for a superconducting magnet and also of fabricating a coil winding assembly for a superconducting magnet as claimed in claim 1, wherein the detail part is an end saddle, a wedge tip, a spacer or a key.

* * * * *

UNITED STATES PATENT AND TRADEMARK OFFICE

CERTIFICATE OF CORRECTION

PATENT NO. : 5,232,650

DATED : August 3, 1993

INVENTOR(S) : Mark R. Behan, et al.

It is certified that error appears in the above-indentified patent and that said Letters Patent is hereby corrected as shown below:

Column 1, line 46: after "G-11CR" insert --epoxy--

Column 5, line 18: "CMM)" should read as --(CMM)--

Column 6, line 41: "th" should read as --the--

Column 6, line 63: "if" should read as --is--

Signed and Sealed this

Fifth Day of April, 1994

Attest:

Bruce Lehman

BRUCE LEHMAN

*Attesting Officer*

*Commissioner of Patents and Trademarks*